000
United States Patent Office 3,063,847
Patented Nov. 13, 1962

3,063,847
DILLED CELERY
Thomas J. Burrows, 570 Rentz Place, Cincinnati 38, Ohio
No Drawing. Filed July 5, 1960, Ser. No. 40,554
1 Claim. (Cl. 99—186)

This invention relates generally to a celery food product and the method of preserving a celery food product and more particularly to a dilled celery food product and the method of preparing and preserving dilled celery.

Preserving fruits and vegetables by "pickling" for example as by first cooking the fruit or vegetables and soaking in a vinegar or brine solution prior to cooking, is well known. Such processes usually require the addition of food preservatives such as benzoate of soda, alum, sodium nitrate, etc., and are now generally considered undesirable for human consumption due to the health hazards, particularly when used in large quantities. An objection to the previous method of preserving foods is that quite often the food product became soft and flabby upon standing and generally unappetizing due to the change in the characteristics of the food from its natural state. This is particularly true with the processing of celery and it is particularly noticeable with celery since celery, in its fresh condition is very crisp and has a pleasant appearance. Prior preserving processing of celery caused the celery to become discolored and soft. The celery lost its natural color and became soft and flabby and generally unpalatable.

A special problem exists in preserving celery in that prior attempts have required that the product be placed in a vinegar or brine solution and allowed to stand for long periods of time and in addition to the vinegar or brine solution a long list of other ingredients were also required to produce the product. A serious disadvantage was found in such process in that food products preserved in a storng brine solution had to be further processed before packing in order to rid them of the excess salt which has the undesirable effect of making the product unpalatable. As a result, to the best of my knowledge, there is no preserved celery food product presently on the market.

It is therefore an object of the present invention to provide a preserved celery food product and process of preparing the same which product is far superior to any that has heretofore been produced.

Another object of the present invention is to prepare a preserved celery product and method of preparing the same which will preserve the celery in its natural crisp condition and further preserve the clear pleasing appearance of fresh celery.

Still another object of the present invention is to provide a process of preserving celery wherein the time required for exercising and completing the process is greatly reduced from the time required by an presently known preserving processes.

Another object of the present invention is to provide a novel dilled celery food product and method of preserving said dilled celery which will result in a celery food product heretofore unknown which is very pleasing in appearance and one which may be stored for an indefinite period of time without losing its crispness and pleasant appearance.

Still another object of the present invention is to provide a new preserved food product having many desirable characteristics.

Still another object of the present invention is to reduce the time required for treatment in the preparation of a preserved celery product and to achieve this end I have provided a process which will reduce prior processes from a period in excess of 50 days to a matter of a few days.

The following description sets forth in detail the improved method of carrying out the present invention, however, the present disclosed method constitutes but one of the various ways in which the principle of the invention may be used. It is also to be understood that the phraseology and terminology herein used are for purposes of description and not of limitation, as the scope of the present invention is denoted by the appended claims.

In carrying out my improved process, the first step is to clean the celery in cold water. The leaves of the celery are removed from the stock and substantially all of the remaining portion of the celery stock may be used. In the heart portion of the celery even the leaves can be used. Preferably, but not necessarily the strings of the celery are also removed.

It is important not to use hot water in cleaning the celery since it has been found that the celery will become soggy and lose its crispness and his crispness cannot be recovered in the later process, therefore, it is essential to use cold water or the natural cold water temperature as it flows from the ordinary faucet.

After the celery is thoroughly cleaned, it is preferably cut into small bite pieces of approximately 1 to 2 inches in length. This particular size is not critical but it has been found to be a convenient size which can be readily handled and eaten. The cleaned and cut celery pieces are then placed in sterilized containers for example, a ten ounce or 1 quart jar has been found to be very suitable for this purpose. One clove of garlic is preferably placed in the sterilized jar prior to placing the clean cut celery into the jar. Optionally a red hot pepper may be added to this combination and is used to lend a hot flavor to the celery. The addition of one small red hot pepper to a 10 ounce or 1 quart jar has a noticeable effect upon the flavor of the celery.

I next prepare a quantity of dilling solution which is made up to two (2) quarts of vinegar preferably cider vinegar light in color and 4 quarts of water. I then add 7 to 8 ounces of common table salt (sodium chloride) and 3½ tablespoons of whole dill seed.

The above mixture is then placed in a suitable container with a lid thereon and brought to a boil. The mixture is allowed to boil lightly for at least five minutes. The hot mixture is then poured over the celery contained in the jars so that the level of the liquid covers the uppermost pieces of the celery in the jar. The jar is then sealed while the liquid is still very hot. The celery in solution is allowed to stand for approximately three to four days and is then ready to eat. Dilled celery prepared in accordance with this process may be stored for an indefinite length of time without refrigeration and without a change in its appearance or flavor. It will be understood that once the container has been opened it is preferable to refrigerate the remaining contents.

It will thus be seen that I have provided a novel preserved celery food product and method of preparing the same. No harmful preservatives are used and the product may be prepared in a relatively short period of time. The natural characteristics namely, crispness, color and flavor of the celery are preserved. The addition of the dill lends an unexpected flavor heretofore unknown in a celery food product.

An outstanding feature of the present process is that it is possible to create within a few days a high quality, dilled celery product which which is highly preserved and will remain so over an indefinite period of time and one which is far superior to any similar product that can be produced under any existing method.

Obviously those skilled in the art may make various changes in the process and the specific method described without departing from the spirit and scope of the invention as defined by the appended claim, and I therefore do not wish to be limited to the precise process herein explained.

Having thus described my invention, what I claim as new and useful and desire to secure by United States Letters Patent, is:

A method of preparing a preserved dilled celery food product from fresh celery wherein the preserved celery retains the natural tender crispness and pleasing clear appearance of fresh celery, comprising the steps of removing the leaves and strings from the celery stock, washing the celery stock in clean cold water, cutting the stock into small bite size pieces of approximately one to two inches in length, adding one clove of garlic to each quart of cut celery, adding one small red hot pepper to approximately each quart of cut celery, providing a dilling solution comprising mixing approximately two quarts of cider vinegar light in color, approximately four quarts of water, 7 to 8 ounces of common table salt, and approximately 3½ tablespoons of dill seed, placing said dilling solution in a container with a lid thereon and heating said solution until it begins to boil and then boiling lightly for at least five minutes, pouring said hot dilling solution over said celery in said container so that all pieces of celery are covered by said dilling solution and sealing said container while said solution is still hot and allowing said celery and dilling solution to stand for approximately 3 to 4 days before eating.

References Cited in the file of this patent

UNITED STATES PATENTS 2,892,722     Agan _____ June 30, 1959

OTHER REFERENCES

Farmer: "The Boston Cooking-School Cook Book," 1945, p. 739.

Bombauer et al.: "The Joy of Cooking," 1953, p. 838.